US012661786B2

(12) United States Patent
Neukom et al.

(10) Patent No.: US 12,661,786 B2
(45) Date of Patent: Jun. 23, 2026

(54) INTERNAL ASSET MODEL RECONSTRUCTION FOR INSPECTION

(71) Applicant: Baker Hughes Holdings LLC, Houston, TX (US)

(72) Inventors: Tobias Neukom, Zurich (CH); Markus Andreas Wiesendanger, Zurich (CH); Nitish Kumar Jha, Zurich (CH); Moritz Benjamin Oetiker, Zurich (CH); Markus Humbel, Bubikon (CH)

(73) Assignee: Baker Hughes Holdings LLC, Houston, TX (US)

( * ) Notice: Subject to any disclaimer, the term of this patent is extended or adjusted under 35 U.S.C. 154(b) by 134 days.

(21) Appl. No.: 18/498,317

(22) Filed: Oct. 31, 2023

(65) Prior Publication Data

US 2024/0173863 A1      May 30, 2024

Related U.S. Application Data

(60) Provisional application No. 63/428,461, filed on Nov. 29, 2022.

(51) Int. Cl.
| | |
|---|---|
| *B25J 9/16* | (2006.01) |
| *G01S 17/89* | (2020.01) |
| *H04N 23/695* | (2023.01) |

(52) U.S. Cl.
CPC ............. *B25J 9/1664* (2013.01); *G01S 17/89* (2013.01); *H04N 23/695* (2023.01)

(58) Field of Classification Search
None
See application file for complete search history.

(56) References Cited

U.S. PATENT DOCUMENTS

| | | | | |
|---|---|---|---|---|
| 2011/0282622 A1* | 11/2011 | Canter | ................... | G06V 20/36 |
| | | | | 702/150 |
| 2018/0319594 A1* | 11/2018 | Blevins | ...................... | B66F 9/18 |
| 2018/0335521 A1* | 11/2018 | Coddington | ............ | G01S 17/87 |
| 2020/0114836 A1* | 4/2020 | Day | ........................ | F16M 11/38 |
| 2021/0310962 A1* | 10/2021 | Oetiker | ................ | G05D 1/0272 |
| 2021/0334538 A1* | 10/2021 | Marotta | ................. | G01S 17/89 |
| 2022/0335688 A1* | 10/2022 | Eckman | .............. | G06F 18/2431 |
| 2023/0161014 A1* | 5/2023 | Pan | ........................... | G06T 7/73 |
| | | | | 382/103 |

* cited by examiner

*Primary Examiner* — Arslan Azhar
(74) *Attorney, Agent, or Firm* — Mintz, Levin, Cohn, Ferris, Glovsky and Popeo, P.C.

(57) ABSTRACT

In one aspect a system for asset model reconstruction is provided. The system includes a data collection assembly including a rotator, a LIDAR sensor coupled to the rotator and arranged to acquire LIDAR point cloud data of an asset, an inertial measurement unit (IMU) arranged to collect inertial data of the data collection assembly and a computing system communicatively coupled to the data collection assembly and including at least one data processor and a memory storing instructions which, when executed by the at least one processor, cause the at least one processor to perform operations including receiving rotational data from the rotator, receiving inertial data from the IMU, receiving LIDAR point cloud data from the LIDAR sensor and generating a surface model of the asset.

20 Claims, 9 Drawing Sheets

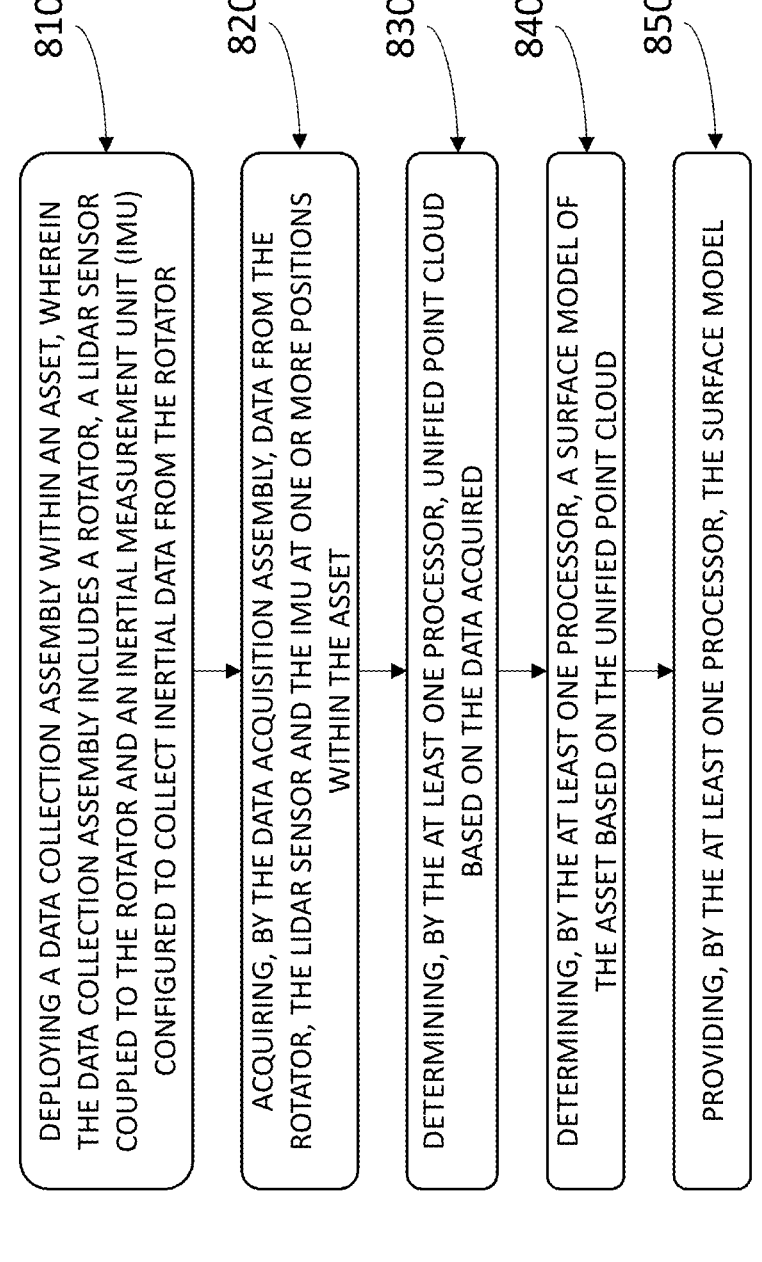

800

810

DEPLOYING A DATA COLLECTION ASSEMBLY WITHIN AN ASSET, WHEREIN THE DATA COLLECTION ASSEMBLY INCLUDES A ROTATOR, A LIDAR SENSOR COUPLED TO THE ROTATOR AND AN INERTIAL MEASUREMENT UNIT (IMU) CONFIGURED TO COLLECT INERTIAL DATA FROM THE ROTATOR

820

ACQUIRING, BY THE DATA ACQUISITION ASSEMBLY, DATA FROM THE ROTATOR, THE LIDAR SENSOR AND THE IMU AT ONE OR MORE POSITIONS WITHIN THE ASSET

830

DETERMINING, BY THE AT LEAST ONE PROCESSOR, UNIFIED POINT CLOUD BASED ON THE DATA ACQUIRED

840

DETERMINING, BY THE AT LEAST ONE PROCESSOR, A SURFACE MODEL OF THE ASSET BASED ON THE UNIFIED POINT CLOUD

850

PROVIDING, BY THE AT LEAST ONE PROCESSOR, THE SURFACE MODEL

FIG. 8

INTERNAL ASSET MODEL RECONSTRUCTION FOR INSPECTION

RELATED APPLICATION

This application claims priority under 35 U.S.C. § 119(e) to U.S. Provisional Application No. 63/428,461 filed Nov. 29, 2022, the entire contents of which are hereby expressly incorporated by reference herein.

FIELD OF THE INVENTION

The present disclosure pertains to the field of asset model reconstruction. Specifically, the present disclosure relates to technology for conducting remote, internal inspection of assets such as pressure vessels, storage tanks and other assets that have confined spaces and may further be inaccessible to humans.

BACKGROUND

Internal inspection of assets such as pressure vessels and storage tanks and other confined spaces, for example, in the oil and gas and automotive industries, is essential to the operation and maintenance of such assets.

Asset model reconstruction is a useful way to develop models of assets for purposes of inspection, design optimization simulation, and more. Asset model reconstruction can be performed, for example, with the use of laser imaging, detection, and ranging (LIDAR) sensors. LIDAR sensors utilize lasers to emit many beams of light within a space. The beams of light that are emitted into the space then collide with objects and/or surfaces within the space and are reflected. LIDAR sensors then measure the time that it takes for the reflected light to return to a receiver within the sensor. This data can then be used to make a virtual representation of the space.

SUMMARY

In one aspect a system for asset model reconstruction is provided. In some embodiments, the system can include a data collection assembly including a rotator, a LIDAR sensor coupled to the rotator and arranged to acquire LIDAR point cloud data of an asset, an inertial measurement unit (IMU) arranged to collect inertial data of the data collection assembly and a computing system communicatively coupled to the data collection assembly and including at least one data processor and a memory storing instructions which, when executed by the at least one processor, cause the at least one processor to perform operations. In some embodiments the operations performed by the processor include receiving rotational data from the rotator, receiving inertial data from the IMU, receiving LIDAR point cloud data from the LIDAR sensor and generating a surface model of the asset.

In some embodiments, the rotator may be arranged to rotate the LIDAR sensor about a first axis and the LIDAR sensor may be arranged to emit pulsed light waves in a two-dimensional plane to collect point cloud data as the rotator rotates.

In some embodiments, the system includes a navigable device and the data collection assembly may be coupled to the navigable device and the navigable device may be arranged to navigate the data collection assembly within the asset.

In some embodiments, the navigable device may be a pole extending within the asset and having a central axis parallel to the first axis and including a wire encoder and the at least one processor may be arranged to receive the positioning data from the wire encoder.

In some embodiments, the navigable device may be a mobile robot arranged to move along a path within an internal volume of the asset. In some cases, the at least one processor may be further perform operations including transmitting a first control signal to the mobile robot operative to move the mobile robot along the path. In some cases, the mobile robot further includes magnetic coupling mechanisms to magnetically engage with an internal surface of the asset.

In some embodiments, the data collection assembly includes a pan-tilt camera assembly coupled to the rotator and the LIDAR sensor, the pan-tilt camera assembly including one or more cameras, a second rotator arranged to tilt the pan-tilt camera assembly and the LIDAR sensor about a second axis. The at least one processor can further perform operations including receiving image data from the one or more cameras and receiving second rotational data from the second rotator. In some embodiments, the pan-tilt camera assembly includes one or more lights.

In another aspect a method for asset model reconstruction is provided. In some embodiments, the method can include deploying a data collection assembly within an asset, the data collection assembly including a rotator, a LIDAR sensor coupled to the rotator and an inertial measurement unit (IMU) arranged to collect inertial data from the rotator. The method also includes acquiring, by the data acquisition assembly, data from the rotator, the LIDAR sensor and the IMU at one or more positions within the asset. The method also includes determining, by the at least one processor, a unified point cloud based on the data acquired and determining, by the at least one processor, a surface model of the asset based on the unified point cloud. The method also includes providing, by the at least one processor, the surface model.

In some embodiments, the LIDAR sensor coupled to the rotator may be arranged to emit pulsed light waves in a two-dimensional plane to collect point cloud data and the rotator may be arranged to rotate the LIDAR sensor. In this case, the acquiring further includes acquiring rotational data from the rotator, acquiring inertial data from an inertial measurement unit (IMU) coupled to the rotator and acquiring one or more sets of point cloud data from the LIDAR sensor corresponding to the one or more positions.

In some embodiments, the one or more positions include a plurality of positions, the method further including time synchronizing, by the at least one processor, the rotational data, the inertial data and the one or more sets of point cloud data acquired at the plurality of positions, generating, by the at least one processor, the unified point cloud associated with the plurality of positions, the unified point cloud generated by registering a first set of point cloud data associated with a first position with a second set of point cloud data associated with a second position.

In some embodiments, the method includes filtering, by the at least one processor, the unified point cloud for density using one or more of spatial averaging, density-based decimation, random decimation, and outlier removal.

In some embodiments, the method includes filtering, by the at least one processor, the unified point cloud for artifacts resulting from a single pulsed light wave contacting multiple targets within the asset and removing the artifacts.

In some embodiments, the method includes determining, by the at least one processor, a first orientation of the first set of point cloud data associated with the first position, determining a second orientation of the second set of point cloud data associated with the second position and merging the second set of point cloud data with the first set of point cloud data based on the first orientation and the second orientation.

In some embodiments, the data collection assembly includes a pan-tilt camera assembly coupled to the rotator and the LIDAR sensor and including one or more cameras and a second rotator arranged to tilt the pan-tilt camera assembly and the LIDAR sensor about a second axis. In this case, the acquiring further includes acquiring image data from the pan-tilt camera assembly and acquiring second rotational data from the second rotator.

In some embodiments, the data collection assembly includes a navigable device, the method further including navigating, by the navigable device, the data collection assembly through the one or more positions along a path within the asset. The acquiring includes acquiring positioning data from a position sensor of the navigable device. In some cases, the navigable device may be a pole extending within the asset. In some cases, the navigable device may be a mobile robot configured to move along a path within an internal volume of the asset.

DESCRIPTION OF DRAWINGS

These and other features will be more readily understood from the following detailed description taken in conjunction with the accompanying drawings, in which:

FIG. 8 illustrates an example method of generating a surface model of an interior of an asset for purposes of inspection.

It is noted that the drawings are not necessarily to scale. The drawings are intended to depict only typical aspects of the subject matter disclosed herein, and therefore should not be considered as limiting the scope of the disclosure.

DETAILED DESCRIPTION

Existing asset model reconstruction systems and methods do not provide sufficiently small, remotely controlled, ruggedized sensors for use in accessing hard-to-reach inspection environments, such as the interior of pressure vessels and storage tanks. Many pressure vessels and storage tanks in the oil and gas and automotive industries, for example, have inspection openings that can be 100 millimeters or less. As such, it can be impossible for human inspection of these assets. Current 3-dimensional LIDAR technology can include sensors that can be too large to pass-through these small openings. Furthermore, human inspection of assets, in cases where human access is possible, expose humans to unnecessary risks that could be avoided by the use of remote inspection devices and methods.

The systems and methods described herein addresses the aforementioned shortcomings. For example, one or more embodiments of the systems and methods described herein can include an asset model reconstruction system and method of operation configured to produce 3-dimensional mesh models of the interior of assets such as pressure vessels, storage tanks and other assets that may have confined spaces and/or which are difficult to inspect. The asset model reconstruction system described herein may include a 2-dimensional planar LIDAR sensor which may be coupled to a rotating actuator (e.g., a rotator). The sensor and the rotating actuator can be coupled to a remotely controllable navigable device. The internal asset model reconstruction system can be inserted into the opening of an asset to be inspected and can collect multiple streams of data. The data can then be sent to a data processor of a computing device, communicatively coupled to the asset model reconstruction system, to be synchronized by a data processor. The computing device can then output a high-quality internal surface mesh, representing the interior of the asset, to a user via a user interface display, which can used for inspection of the asset.

Advantageously, the systems and methods herein can provide an asset model reconstruction system capable of substantially reducing the time that it takes to generate a 3-dimensional surface model of an asset that is traditionally difficult to inspect. The systems and methods herein can also ensure that the model is up to date and truly represents the asset. Furthermore, the systems and methods herein can eliminate any need for model creation expertise on the user side.

Figure 1:
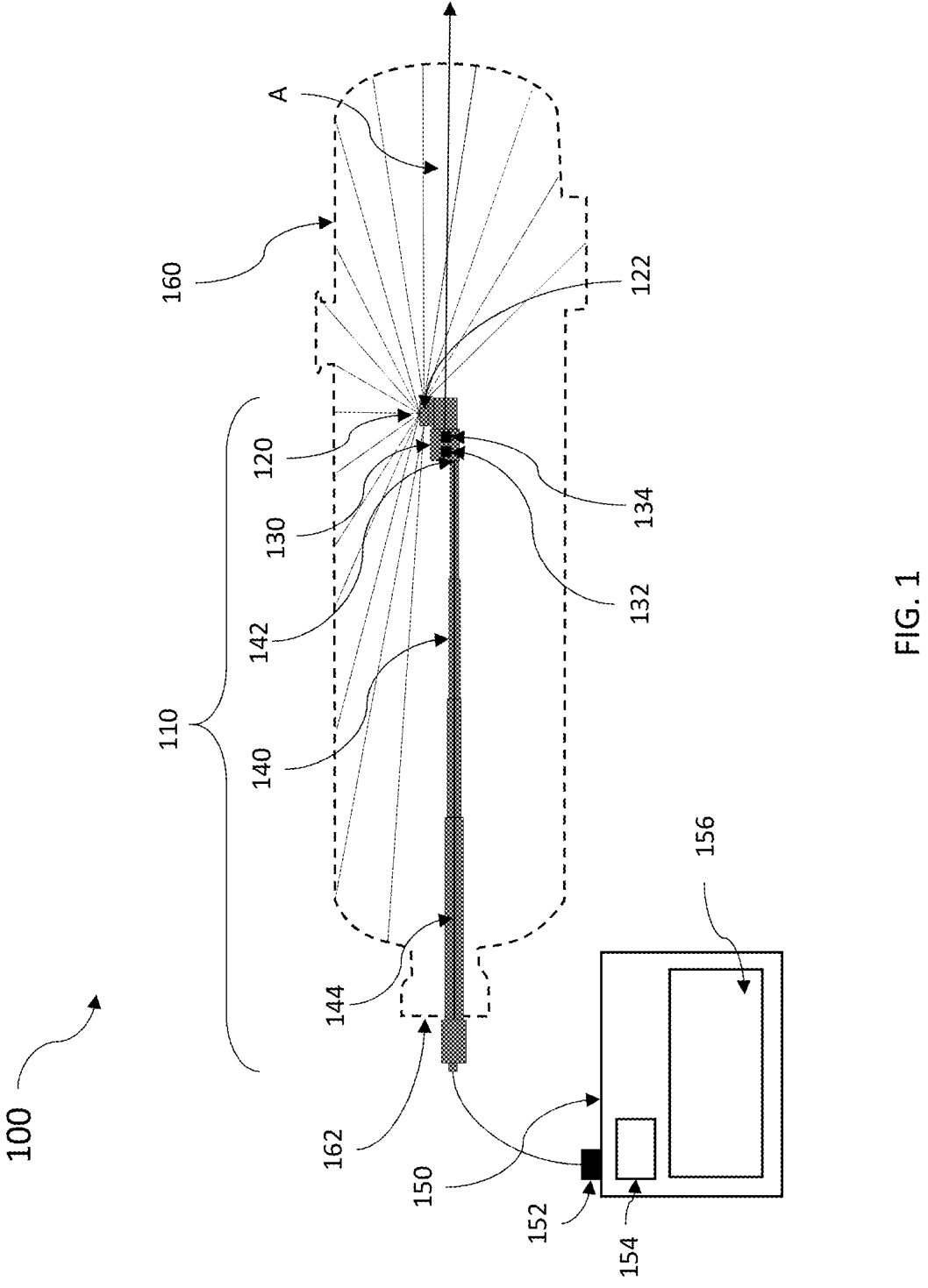
FIG. 1 illustrates one embodiment of an asset model reconstruction system for conducting remote, internal inspection of an asset.

FIG. 1 illustrates one embodiment of an asset model reconstruction system 100 for generating a 3-dimensional mesh model of the interior of an asset 160 having an opening 162 for the purposes of inspection. In some embodiments, the opening 162 of the asset can be no larger than 100 millimeters in diameter. The internal asset model reconstruction device 100 may include a data collection assembly 110. The data collection assembly 110 can include a 2-dimensional planar LIDAR sensor 120 which may be coupled to a rotating actuator (e.g., a rotator) 130 which can then both be coupled to a remotely controllable navigable device at a connection end, which in this embodiment, can be a pole 140 with connection end 142. In this embodiment, the rotator 130 can be configured to rotate about an axis A, at one or more locations within the asset 160 along axis A. In some embodiments, the rotator 130 can be configured to rotate in both directions about axis A. In some embodiments, the rotator 130 can be configured to cover a rotational distance of 180 degrees about axis A. The pole 140 can be configured to extend the rotator 130 and the LIDAR sensor 120 into the asset 160 through the opening 162 along a path parallel to axis A. The LIDAR sensor 120 can be configured to have an emitter 122. In this embodiment, the emitter 122 can be configured to be positioned in a normal direction relative to the rotational axis of the rotator 130 (i.e. axis A). In other embodiments, the emitter 122 may be configured in other orientations relative to the axis of rotation of the rotator 130. The LIDAR sensor 120 can be configured to collect point cloud data of the asset 160 from emitter 122 as the LIDAR sensor 120 is rotated about axis A by the rotator 130. Rotator 130 can be configured to collect positional data from a rotational encoder 132 as well as inertial data from an inertial measurement unit (IMU) 134 as the pole 140 is extended within the asset 160. In some embodiments, the IMU 134 can be configured to collect inertial data regarding the amount of deflection in the pole 140 as the pole 140 is extended within the asset 160. In some embodiments, the pole 140 can be a simple rod-like pole. In some embodiments, the pole 140 can be a telescopic pole including a wire encoder 144 configured to collect positional data as the pole 140 is extended into the asset 160.

The asset model reconstruction system 100 may further include a computing system 150 that can be communicatively coupled to the data collection assembly 110. The communicative coupling may be achieved via a wired connection, or via a wireless connection. In some embodiments, the computing system 150 can include controller 152 which can be configured to control the pole 140. In some embodiments, the controller 152 can control the pole 140 by continuously or discretely extending the pole into and/or out of the asset 160 along the path parallel to axis A. In other embodiments, the pole 140 can be controlled directly by a user by manually pushing/pulling on a push rod to extend and withdraw the pole 140 in and out of the asset 160. The orientation of axis A can also be changed within the asset 160. The computing system 150 can further include a data processor 154 and a user interface display 156. The data processor can be configured to receive the data from the data collection assembly 110 as the data collection assembly 110 is extended into the asset. The data received by the processor 154 can include data from the LIDAR sensor 120, including the point cloud data from the emitter 122. The processor can also be configured to receive positional data from a rotational encoder 132 of the rotator 130 and inertial data from the IMU 134, as well as positional data from the wire encoder 144 of the pole 140. The user interface display 156 can be configured to provide a user with a mesh model of an asset. The user interface display 156 may further be configured to receive user input to aid in the process of generating the mesh model. In some embodiments the user interface display may be a touchscreen.

Figure 2:
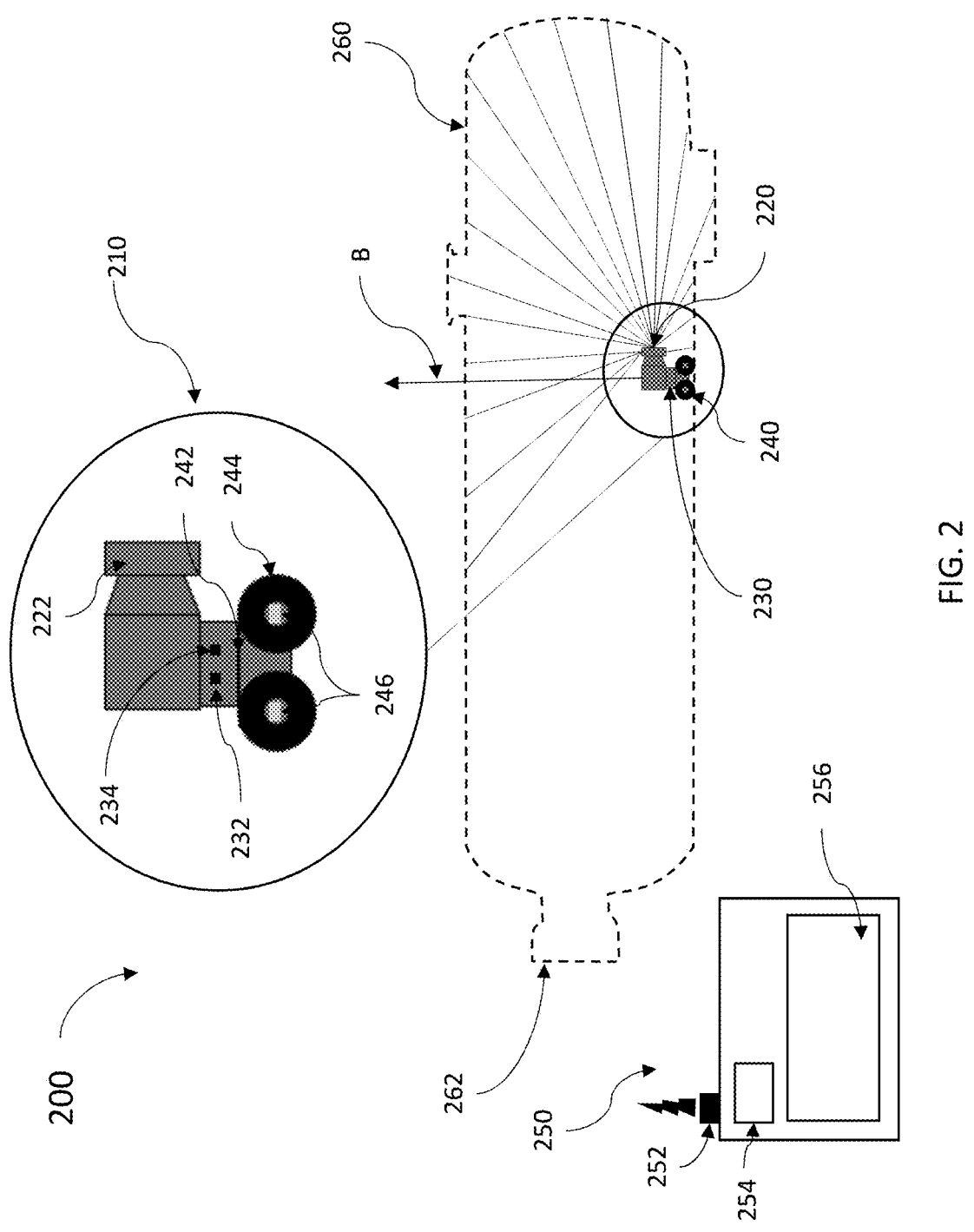
FIG. 2 illustrates another embodiment of an asset model reconstruction system for conducting remote, internal inspection of an asset.

FIG. 2 illustrates another embodiment of an asset model reconstruction system 200 for generating a 3-dimensional mesh model of the interior of an asset 260 having and opening 262 for the purposes of inspection. In some embodiments, the opening 262 of the asset can be no larger than 100 millimeters in diameter. In other embodiments, the opening 262 of the asset may be larger than 100 millimeters. The asset model reconstruction system 200 may include a data collection assembly 210. The data collection assembly can include a 2-dimensional planar LIDAR sensor 220 which may be coupled to a rotating actuator (rotator) 230 which can then both be coupled to a remotely controllable navigable device at a connection end, which in this embodiment, can be a mobile robot 240 with connection end 242. In this embodiment, the rotator 230 can be configured to rotate about axis B and the mobile robot 240 can be configured to navigate the rotator 230 and the LIDAR sensor 220 into the asset 260 through the opening 262 and navigate within the asset 260 along a path normal to axis B via wheels 244. In other embodiments, the axis B can have a different orientation. For example, in some embodiments, axis B can run parallel to the navigable path of the asset 260. In some embodiments, the mobile robot 240 may include magnetic portions, such as its wheels 244 or similar devices, in order to magnetically engage with an internal surface of an asset to enhance navigable versatility. The LIDAR sensor 220 can be configured to have an emitter 222. In this embodiment, the emitter 222 can be configured in a normal direction relative to the rotational axis of the rotator 230 (e.g., axis B). In other embodiments, the emitter 222 may be configured in other orientations relative to the axis of rotation of the rotator 230. For example, in some embodiments the emitter 222 can be configured in a parallel direction relative to the rotational axis of the rotator 230. In some embodiments, the rotator 230 can be configured to rotate in both directions about axis B. In some embodiments, the rotator 230 can be configured to cover a rotational distance of 180 degrees about axis B. The LIDAR sensor 220 can be configured to collect point cloud data of the asset 260 from emitter 222 as the LIDAR sensor 220 is rotated about axis B by the rotator 230. Rotator 230 can be configured to collect positional data from a rotational encoder 232 as well as inertial data from an inertial measurement unit (IMU) 234. The mobile robot 240 can also be configured to collect positional data from a localization system 246 as the robot 240 navigates the asset 260. In some embodiments, the localization system 246 of the mobile robot 240 be configured to collect positional data from rotational encoders, integral with the wheels 244.

The internal asset model reconstruction device 200 may further include a computing system 250 that can be communicatively coupled to the data collection assembly 210. The communicative coupling may be achieved via a wired connection, or via a wireless connection. The computing system 250 can include controller 252 which can be configured to control the mobile robot 240. In this embodiment, the controller 252 may control the mobile robot 240 by continuously and/or discretely moving the robot 240 along a wall of the asset 260. The computing system 250 can further include a data processor 254 and a user interface display 256. The data processor can be configured to receive the data from the data collection assembly 210 as the data collection assembly 210 is extended into the asset. The data received by the processor 254 can include data from the LIDAR sensor 220, including the point cloud data from the emitter 222. The processor can also be configured to receive positional data from a rotational encoder 232 of the rotator 230 and inertial data from the IMU 234, as well as positional data from the localization system 246 of the mobile robot 240. The user interface display 256 can be configured to provide a user with a mesh model of an asset 260. The user interface display 256 may further be configured to receive user input to aid in the process of generating the mesh model. In some embodiments the user interface display may be a touchscreen.

Figure 3:
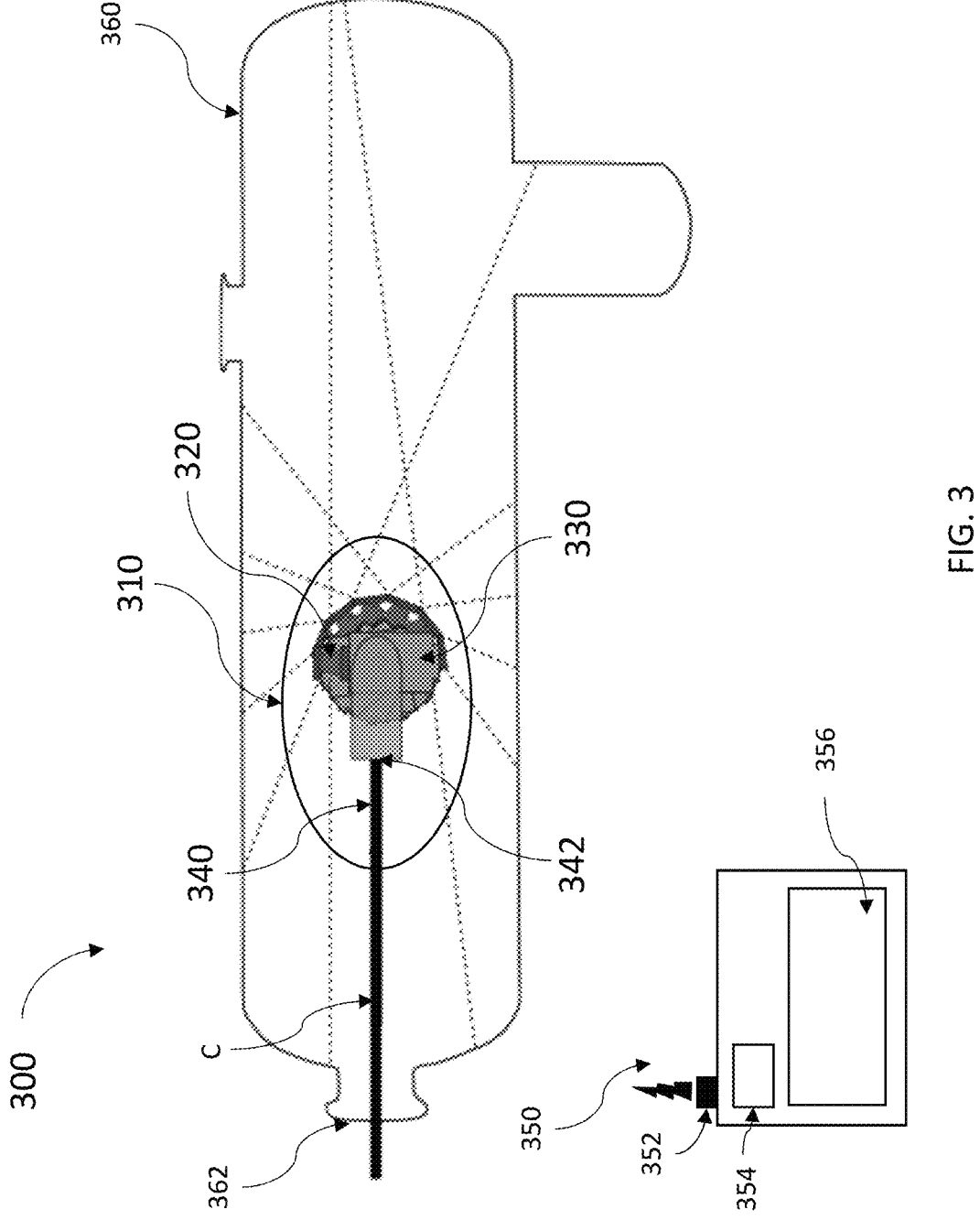
FIG. 3 is illustrates another embodiment of an asset model reconstruction system for conducting remote, internal inspection of an asset.

FIG. 3 illustrates another embodiment of an asset model reconstruction system 300 for generating a 3-dimensional mesh model of the interior of an asset 360 having an opening 362 for the purposes of inspection. The internal asset model reconstruction device 300 may include a data collection assembly 310. The data collection assembly 310 can include a 2-dimensional planar LIDAR sensor 320 which may be coupled to a pan-tilt camera assembly 330, which can then both be coupled to a remotely controllable navigable device at a connection end, which in this embodiment, can be a pole 340 with connection end 342. The asset model reconstruction system 300 may further include a computing system 350 that can be communicatively coupled to the data collection assembly 310. The communicative coupling may be achieved via a wired connection, or via a wireless connection. The computing system 350 can include controller 352 which can be configured to control the data collection assembly 310. The computing system 350 can further include a data processor 354 and a user interface display 356. The data processor can be configured to receive the data from the data collection assembly 310 as the data collection assembly 310 collects data from the asset 360.

Figure 4:
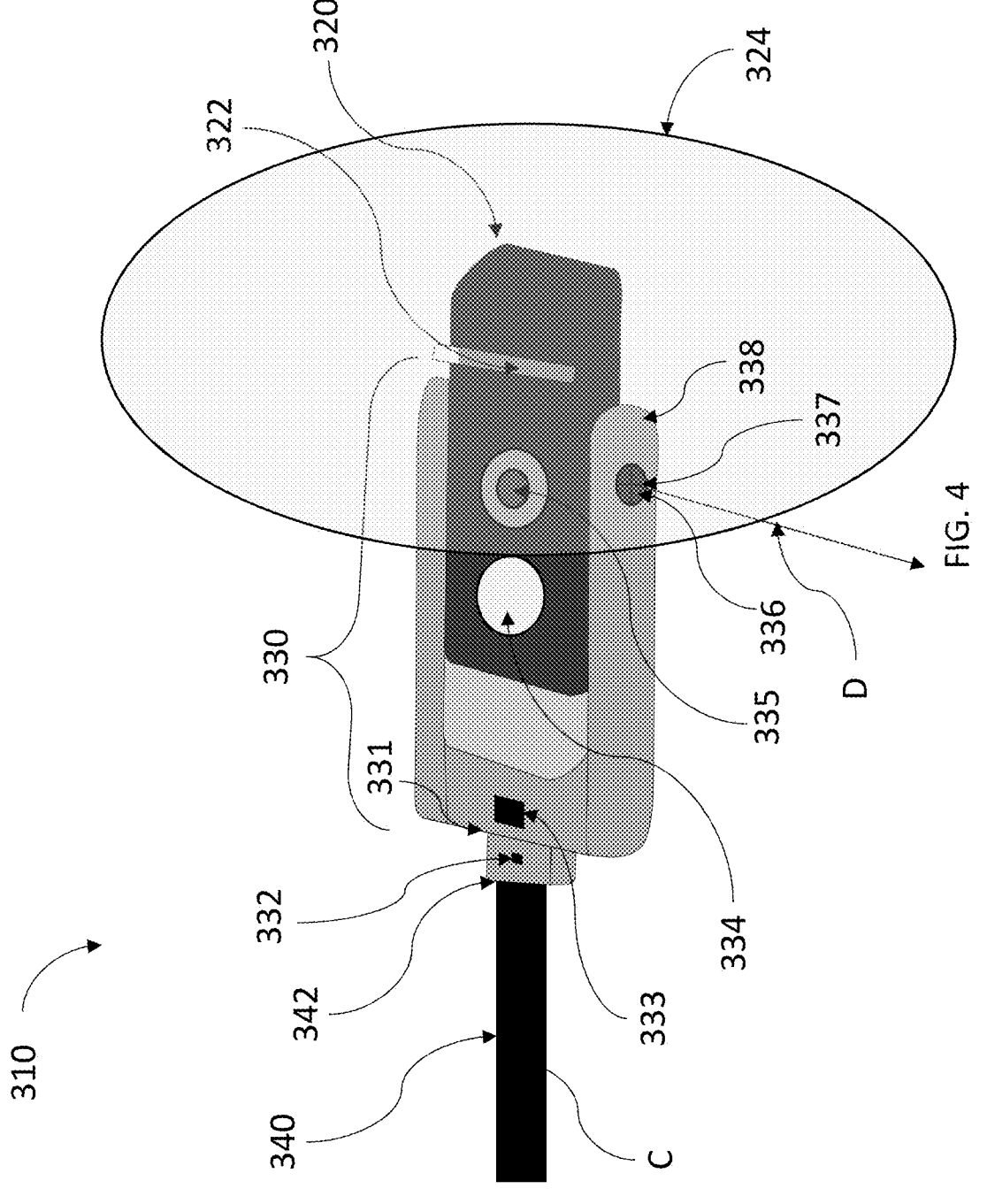
FIG. 4 is a detailed view of the asset model reconstruction system of FIG. 3.

FIG. 4 illustrates a detailed view of the data collection assembly 310 of the internal asset model reconstruction device 300. In some embodiments, the pan-tilt camera assembly 330 can be coupled to the connection end 342 of the pole 340 at a first end 331. In some embodiments, the pan-tilt camera assembly 330 can be configured to rotate about an axis C, at one or more locations within the asset 360. The axis C can run parallel to the central axis of the pole 340. In some embodiments, the pan-tilt camera assembly can include a first rotational encoder 332 at the first end 331. The pan-tilt camera assembly can further include an inertial measurement unit (IMU) 333. In some embodiments, the IMU 333 can be included in the LIDAR sensor 320. The pole 340 can be configured to extend the pan-tilt camera assembly 330 and the LIDAR sensor 320 into the asset 360 through the opening 362 along a path parallel to axis C. In some embodiments, the orientation of axis C can be changed within the asset 360. In some embodiments, the pan-tilt camera assembly 330 can be coupled to the LIDAR sensor 320 at a second end 338. The LIDAR sensor 320 can be configured to have an emitter 322. In this embodiment, the emitter 322 can be configured to be positioned in a normal direction relative to the rotational axis C. In other embodiments, the emitter 322 may be configured in other orientations relative to the axis C. The LIDAR sensor 320 can be configured to collect point cloud data of the asset 360 from emitter 322 as the LIDAR sensor 320 is rotated about axis C by the pan-tilt camera assembly 330. In some embodiments, the LIDAR sensor 320 can be configured to collect point cloud data within a 2-dimensional plane 324. In some embodiments, the pan-tilt camera assembly 330 can further include one or more lights 334. In some embodiments, the pan-tilt camera assembly 330 can further include one or more cameras 335. Additionally, the pan-tilt camera assembly 330 can be configured to include a hinge 336 located at a position between the first end 331 and the second end 338 of the pan-tilt camera assembly. In some embodiments, the pan-tilt camera assembly 330 can be configured to tilt about the hinge 336 along an axis D, at one or more locations within the asset 360. In some embodiments, the axis D can be normal to the axis C. The hinge 336 can further include a second rotational encoder 337. The data collection assembly 310 can be configured to collect positional data from the first rotational encoder 332 and the second rotational encoder 337. The data collection assembly 310 can also be configured to collect inertial data from the IMU 333 as the pole 340 is extended and/or otherwise moved within the asset 360. In some embodiments, the IMU 333 can be configured to collect inertial data regarding the amount of deflection and/or movement in the pole 340 as the pole 340 is extended within the asset 360. In some embodiments, the data collection assembly 310 can also be configured to collect image data from the at least one camera 335.

The data received by the processor 354 of the computing system 350 (in reference to FIG. 3) can include data from the LIDAR sensor 320, including the point cloud data from the emitter 322. The processor 354 can also be configured to receive positional data from the first rotational encoder 332 and the second rotational encoder 337 of the pan-tilt camera assembly 330. The processor 354 can also be configured to collect inertial data from the IMU 333, as well as image data from the at least one camera 336. The user interface display 356 of the computing system 350 can be configured to provide a user with a mesh model of an asset 360. The user interface display 356 may further be configured to receive user input to aid in the process of generating the mesh model. In some embodiments the user interface display may be a touchscreen.

Figure 5:
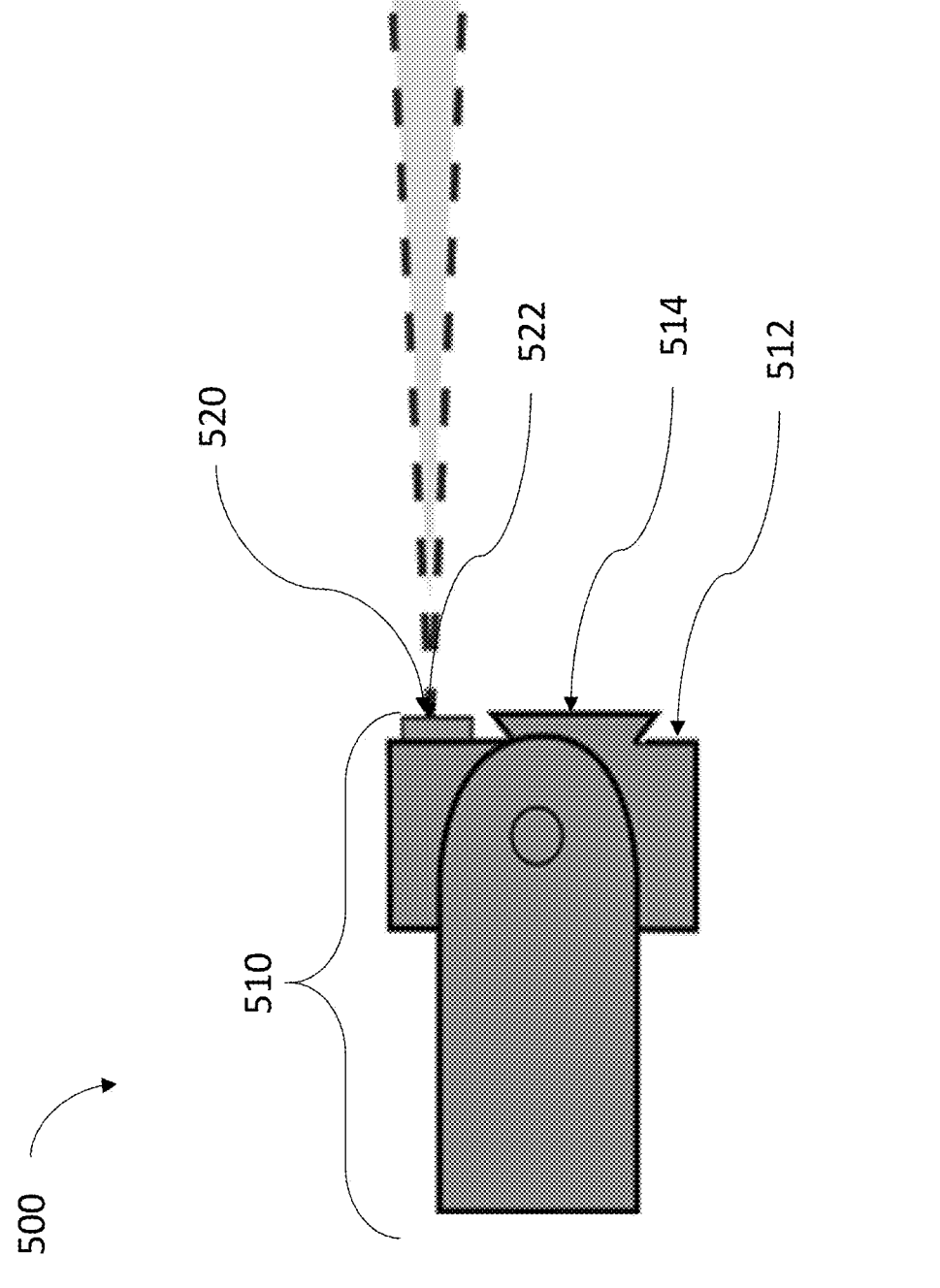
FIG. 5 is an example orientation of a LIDAR sensor position relative to an at least one camera of the asset model reconstruction system of FIG. 3.

FIG. 5 illustrates one possible orientation 500 of a LIDAR sensor relative to an at least one camera according to FIGS. 3-4. In orientation 500, a pan-tilt camera assembly 510 can include a face 512. In orientation 500, and at least one camera 514 can be located on the face 512 of the pan-tilt camera assembly 510. Additionally, in orientation 500, a LIDAR sensor 520 including an emitter 522 can be located on the face 512 of the pan-tilt camera assembly 510.

Figure 6:
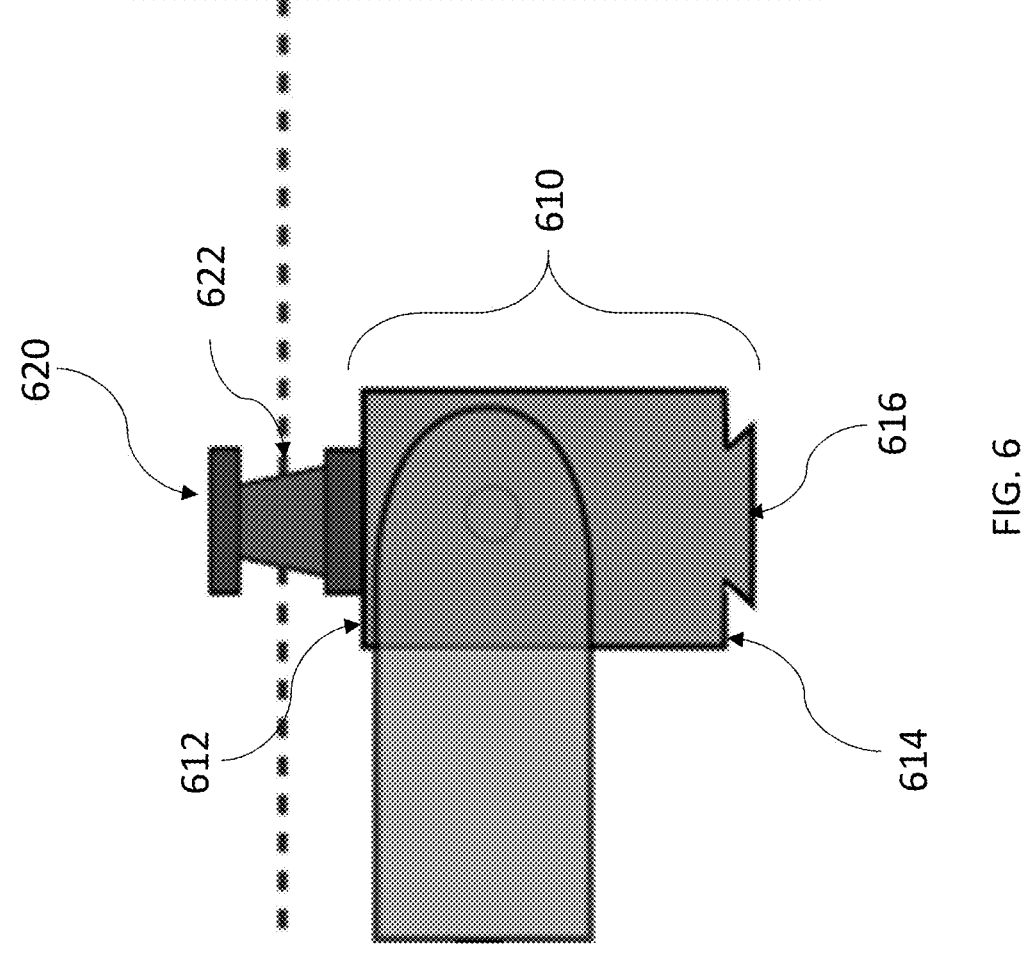
FIG. 6 is another example orientation of a LIDAR sensor position relative to an at least one camera of the asset model reconstruction system of FIG. 3.

FIG. 6 illustrates another possible orientation 600 of a LIDAR sensor relative to an at least one camera according to FIGS. 3-4. In orientation 600, a pan-tilt camera assembly 610 can include a first face 612 and a second face 614, opposite the first face 612. In orientation 600, an at least one camera 616 can be located on the second face 614 of the pan-tilt camera assembly 610. Additionally, in orientation 600, a LIDAR sensor 620, including an emitter 622, can be coupled to the first face 612 of the pan-tilt camera assembly 610.

Figure 7:
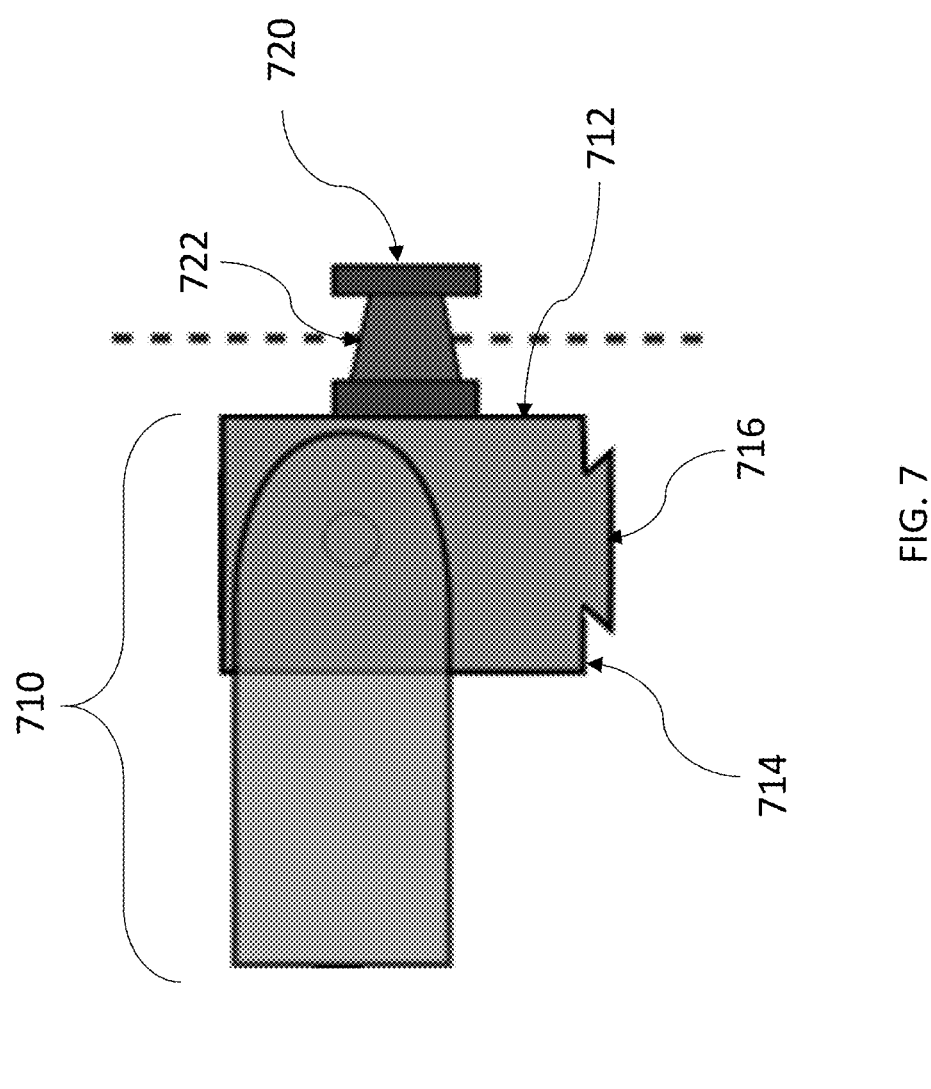
FIG. 7 is another example orientation of a LIDAR sensor position relative to an at least one camera of the asset model reconstruction system of FIG. 3.

FIG. 7 illustrates another possible orientation 700 of a LIDAR sensor relative to an at least one camera according to FIGS. 3-4. In orientation 700, a pan-tilt camera assembly 710 can include a first face 712 and a second face 714, adjacent the first face 712. In orientation 700, at least one camera 716 can be located on the second face 714 of the pan-tilt camera assembly 710. Additionally, in orientation 700, a LIDAR sensor 720, including an emitter 722, can be coupled to the first face 712 of the pan-tilt camera assembly 710.

FIG. 8 illustrates an example method 800 for generating a 3-dimensional internal mesh model of an asset using systems 100 and 200 shown in FIGS. 1 and 2. Method 800 is described hereafter in reference to FIG. 1. The method 800 can include step 810 of deploying a data collection assembly within an asset. In some embodiments, the data collection assembly can be deployed within the asset by simply placing the assembly within the asset, or coupling it to a navigable device, such as a pole or a mobile robot, as discussed above.

The method 800 can include step 820 of acquiring, by the data acquisition assembly, data from the rotator, the LIDAR sensor and the IMU at one or more positions within the asset. The acquiring can include acquiring data via the data collection assembly 110 at a first position of a sequential or non-sequential plurality of positions within the asset 160. The data can include point cloud data acquired or generated by the emitter 122, inertial data acquired or generated by the IMU 134, positional data acquired or generated by the rotational encoder 132, and/or location data acquired or by the navigable device. In some embodiments, prior to deploying and/or acquiring, the method can include a step of calibrating the data collection assembly. The calibrating can include rotating the LIDAR sensor 120 about the rotator 130 to establish a zero position for scanning.

The method 800 can also include the step 830 of determining, by the at least one processor, unified point cloud based on the data acquired. In some embodiments, this step can include determining a first point cloud associated with the first position based on the acquired data received from the data collection assembly 110. The data acquired from the LIDAR sensor 120 can further include timestamp data corresponding to the relative point cloud data acquired. Additionally, the data acquired from the rotator 130 can further include timestamp data corresponding to the relative positional and inertial data. Accordingly, step 830 of determining can include a step of time synchronizing the data received from the LIDAR sensor 120 and the rotator 130. Time synchronizing the data can include the steps of determining a difference between the timestamp data acquired by the LIDAR sensor 120 and the timestamp data acquired by the rotator 130 and accounting for the difference. Determining can then include filtering the data received for density, as well as filtering the data received for artifacts. Filtering the data for density can include spatial averaging, density-based decimation, random decimation, and outlier removal. Filtering the data for artifacts can include removing point cloud data points resulting from a single light beam contacting multiple targets within the asset. In some cases, when a single light beam comes into contact with multiple targets within the asset, the resulting distance data can be an average of the distances to the multiple targets. In this case, the resulting distance data does not represent an actual surface within the asset. Accordingly, such data points can be removed in step 830. Step 830 can be repeated for all of the sequential or non-sequential plurality of positions within the asset 160, resulting in a plurality of point clouds. The number of point clouds can correspond to the number of the sequential plurality of positions. Once the plurality of point clouds are determined, step 830 can further include merging the plurality of point clouds into a unified point cloud. Merging can include a step of registering a second point cloud to the first point cloud, registering a third point cloud to the first and second point clouds, and so on. In some embodiments, the step 830 can also include orienting and aligning the plurality of point clouds with one another. The orienting and aligning can be accomplished by minimizing the spatial transformation of each point cloud in the overlapping area between aligned point clouds. Step 830 can also include a step of stripping the unified point cloud, wherein a user may crop out portions of the point cloud chain via a process of selection and deletion.

The method 800 can also include the method step 840 of determining, by the at least one processor, a surface model of the asset based on the unified point cloud. In some embodiments, step 840 can include using a method of Poisson Screening to obtain an oriented triangular mesh representation of any surfaces captured by the point cloud data. Furthermore, the mesh obtained by the Poisson Screening method can be trimmed to eliminate surface elements which are not reasonably supported by the point cloud data.

The method 800 can include the method step 850 of providing the surface model to the user interface display 156 of the computing device 150, described in relation to FIGS. 1 and 2.

Figure 9:
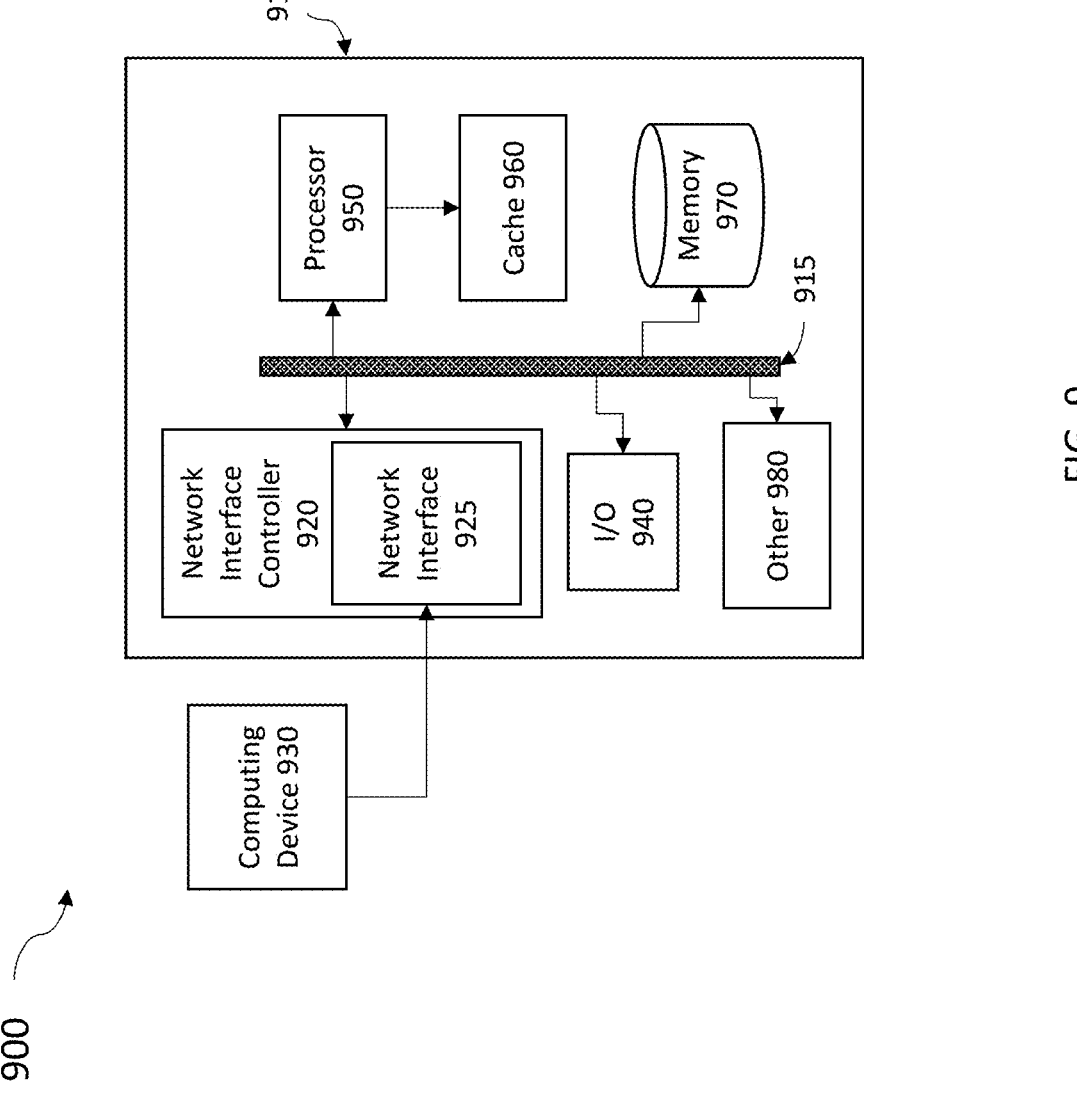
FIG. 9 is a block diagram of a computing system suitable for use in implementing the computerized components of the asset model reconstruction systems described herein.

FIG. 9 is a block diagram 900 of a computing system 910 suitable for use in implementing the computerized components described herein, such as the computing systems 150, 250, 350 described above. In broad overview, the computing system 910 includes at least one processor 950 for performing actions in accordance with instructions, and one or more memory devices 960 and/or 970 for storing instructions and data. The illustrated example computing system 910 includes one or more processors 950 in communication, via a bus 915, with memory 970 and with at least one network interface controller 920 with a network interface 925 for connecting to external devices 930, e.g., a computing device. The one or more processors 950 are also in communication, via the bus 915, with each other and with any I/O devices 930 at one or more I/O interfaces 930, and any other devices 980. The processor 950 illustrated incorporates, or is directly connected to, cache memory 960. Generally, a processor will execute instructions received from memory. In some embodiments, the computing system 910 can be configured within a cloud computing environment, a virtual or containerized computing environment, and/or a web-based microservices environment.

In more detail, the processor 950 can be any logic circuitry that processes instructions, e.g., instructions fetched from the memory 970 or cache 960. In many embodiments, the processor 950 is an embedded processor, a microprocessor unit or special purpose processor. The computing system 910 can be based on any processor, e.g., suitable digital signal processor (DSP), or set of processors, capable of operating as described herein. In some embodiments, the processor 950 can be a single core or multi-core processor. In some embodiments, the processor 950 can be composed of multiple processors.

The memory 970 can be any device suitable for storing computer readable data. The memory 970 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid-state memory), magnetic disks, and magneto optical disks. A computing device 910 can have any number of memory devices 970.

The cache memory 960 is generally a form of high-speed computer memory placed in close proximity to the processor 950 for fast read/write times. In some implementations, the cache memory 960 is part of, or on the same chip as, the processor 950.

The network interface controller 920 manages data exchanges via the network interface 925. The network interface controller 920 handles the physical, media access control, and data link layers of the Open Systems Interconnect (OSI) model for network communication. In some implementations, some of the network interface controller's tasks are handled by the processor 950. In some implementations, the network interface controller 920 is part of the processor 950. In some implementations, a computing device 910 has multiple network interface controllers 920. In some implementations, the network interface 925 is a connection point for a physical network link, e.g., an RJ 45 connector. In some implementations, the network interface controller 920 supports wireless network connections via network interface port 925. Generally, a computing device 910 exchanges data with other network devices 930, such as computing device 930, via physical or wireless links to a network interface 925. In some implementations, the network interface controller 920 implements a network protocol such as LTE, TCP/IP Ethernet, IEEE 802.11, IEEE 802.16, or the like.

The other computing devices 930 are connected to the computing device 910 via a network interface port 925. The other computing device 930 can be a peer computing device, a network device, or any other computing device with network functionality. For example, a computing device 930 can be a remote controller, or a remote display device configured to communicate and operate the asset model reconstruction systems described herein remotely. In some embodiments, a computing device 930 can include a server or a network device such as a hub, a bridge, a switch, or a router, connecting the computing device 910 to a data network such as the Internet.

In some uses, the I/O interface 930 supports an input device and/or an output device (not shown). In some uses, the input device and the output device are integrated into the same hardware, e.g., as in a touch screen. In some uses, such as in a server context, there is no I/O interface 930 or the I/O interface 930 is not used. In some uses, additional other components 980 are in communication with the computer system 910, e.g., external devices connected via a universal serial bus (USB).

The other devices 980 can include an I/O interface 940, external serial device ports, and any additional co-processors. For example, a computing system 910 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 910, e.g., a touch screen on a tablet device. In some implementations, a computing device 910 includes an additional device 980 such as a co-processor, e.g., a math co-processor that can assist the processor 950 with high precision or complex calculations.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, can be applied to modify any quantitative representation that could permissibly vary without resulting in a change in the basic function to which it is related. Accordingly, a value modified by a term or terms, such as "about." "approximately," and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "approximately" includes within 1, 2, 3, or 4 standard deviations. In certain embodiments, the term "about" or "approximately" means within 50%, 20%, 15%, %, 9%, 8%, 7%, 6%, 5%, 4%, 3%, 2%, 1%, 0.5%, or 0.05% of a given value or range. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A system comprising:
a telescopic pole having a proximal end, a distal end, and a wire encoder, wherein the distal end is controlled to extend into an interior volume of an asset and the wire encoder is configured to collect position data characterizing a position of the distal end as the telescopic pole is extended into the asset;
a rotator coupled to the distal end of the telescopic pole;
a LIDAR sensor coupled to the rotator, wherein the rotator is configured to rotate the LIDAR sensor about a first axis and the LIDAR sensor is configured to emit pulsed light waves in a two-dimensional plane to collect point cloud data as the rotator rotates and as the distal end is extended into the asset;
an inertial measurement unit (IMU) coupled to the distal end of the telescopic pole and configured to collect inertial data at the distal end as the distal end is extended into the asset; and
a computing system including at least one data processor and a memory storing instructions which, when executed by the at least one processor, cause the at least one processor to perform operations comprising
    receiving the position data from the wire encoder,
    receiving rotational data from the rotator,
    receiving the inertial data from the IMU,
    receiving the point cloud data from the LIDAR sensor,
    generating a surface model of the asset based on the position data, rotational data, inertial data, and point cloud data, and
    providing the surface model to a user interface display communicatively coupled to the computing system.

2. The system of claim 1, wherein the distal end of the telescopic pole is configured to be extended along a path within the internal volume of the asset, wherein the first axis of rotation of the rotator is parallel to the path.

3. The system of claim 1, further comprising a pan-tilt camera assembly coupled to the rotator and the LIDAR sensor, the pan-tilt camera assembly comprising:
one or more cameras; and
a second rotator configured to tilt the pan-tilt camera assembly and the LIDAR sensor about a second axis, wherein the at least one processor is further configured to perform operations comprising
    receiving image data from the one or more cameras, and
    receiving second rotational data from the second rotator, wherein the surface model is further generated based on the image data and the second rotational data.

4. The system of claim 3, wherein the pan-tilt camera assembly further comprises one or more lights.

5. The system of claim 2, wherein the at least one processor is further configured to perform operations comprising:
transmitting a first control signal to the telescopic pole operative to extend the distal end within the asset along the path.

6. A method comprising:
controlling a distal end of a telescopic pole to be extended through one or more positions along a path within an interior volume of an asset;
controlling a rotator, provided at the distal end of the telescopic pole, to rotate about a first axis as the distal end is extended along the path within the asset;
controlling a LIDAR sensor, coupled to the rotator, to emit pulsed light waves in a two-dimensional plane as the rotator rotates, receiving, by at least one processor of a computing system, position data characterizing a position of the distal end as the telescopic pole from a wire encoder of the telescopic pole, rotational data from the rotator, point cloud data from the LIDAR sensor, and inertial data from an inertial measurement unit (IMU) provided at the distal end;

determining, by the at least one processor, a unified point cloud based on the position data, rotational data, point cloud data, and inertial data received;

generating, by the at least one processor, a surface model of the asset based on the unified point cloud; and providing, by the at least one processor, the surface model to a user interface display communicatively coupled to the computing system.

7. The method of claim 6, wherein the one or more positions include a plurality of positions, the method further comprising:

time synchronizing, by the at least one processor, the position data, rotational data, inertial data, and point cloud data received at the plurality of positions;

generating, by the at least one processor, the unified point cloud associated with the plurality of positions, the unified point cloud generated by registering a first set of point cloud data associated with a first position with a second set of point cloud data associated with a second position.

8. The method of claim 7, further comprising:

filtering, by the at least one processor, the unified point cloud for density using one or more of spatial averaging, density-based decimation, random decimation, and outlier removal.

9. The method of claim 7, further comprising:

filtering, by the at least one processor, the unified point cloud for artifacts resulting from a single pulsed light wave contacting multiple targets within the asset; and removing, by the at least one processor, the artifacts.

10. The method of claim 7, further comprising:

determining, by the at least one processor, a first orientation of the first set of point cloud data associated with the first position;

determining, by the at least one processor, a second orientation of the second set of point cloud data associated with the second position; and merging, by the at least one processor, the second set of point cloud data with the first set of point cloud data based on the first orientation and the second orientation.

11. The method of claim 6, wherein a pan-tilt camera assembly is coupled to the rotator and the LIDAR sensor, the pan-tilt camera assembly including one or more cameras and a second rotator, the method further comprising:

controlling the second rotator to tilt the pan-tilt camera assembly and the LIDAR sensor to tilt about a second axis;

receiving, by at least one processor, image data from the one or more cameras and second rotational data from the second rotator, wherein the unified point cloud is further determined based on the image data and second rotational data.

12. A system comprising:

a telescopic pole having a distal end configured to be extended into an interior volume of an asset, wherein the telescopic pole comprises a wire encoder configured to collect position data characterizing a position of the distal end as the telescopic pole is extended into the asset;

a rotator, a LIDAR sensor, and an inertial measurement unit (IMU) coupled to the distal end of the telescopic pole; and a computing system including at least one data processor and a memory storing instructions which, when executed by the at least one processor, cause the at least one processor to perform operations comprising:

controlling the distal end of the telescopic pole to extend through one or more positions along a path within the interior volume of the asset, controlling the rotator to rotate the LIDAR sensor about a first axis, controlling the LIDAR sensor to emit pulsed light waves in a two-dimensional plane to collect point cloud data, receiving the position data from the wire encoder, rotational data from the rotator, the point cloud data from the LIDAR sensor, and inertial data from the IMU, generating a surface model of the asset based on the position data, rotational data, point cloud data, and inertial data, and providing the surface model to a user interface display communicatively coupled to the computing system.

13. The system of claim 12, further comprising a second rotator and one or more cameras coupled to the distal end, wherein the at least one processor is further configured to perform operations comprising:

controlling the second rotator to rotate the one or more cameras and the LIDAR sensor about a second axis;

controlling the one or more cameras to acquire image data within the asset; and receiving second rotational data from the second rotator and the image data from the one or more cameras, wherein the surface model is further generated based on the image data and the second rotational data.

14. The system of claim 13, wherein the pan-tilt camera assembly further comprises one or more lights.

15. The system of claim 13, wherein the second axis of rotation of the second rotator is normal to the path that the distal end of the telescopic pole is extended along.

16. The system of claim 12, wherein the at least one processor is further configured to perform operations comprising:

time synchronizing the position data, rotational data, inertial data, and point cloud data received at the plurality of positions;

registering point cloud data associated with each position of the plurality of positions with point cloud data associated with adjacent positions of the plurality of positions to generate unified point cloud associated with the plurality of positions.

17. The system of claim 16, wherein the at least one processor is further configured to perform operations comprising:

filtering the unified point cloud for density using one or more of spatial averaging, density-based decimation, random decimation, and outlier removal.

18. The system of claim 16, wherein the at least one processor is further configured to perform operations comprising:

filtering the unified point cloud for artifacts resulting from a single pulsed light wave contacting multiple targets within the asset; and removing the artifacts.

19. The system of claim 16, wherein the at least one processor is further configured to perform operations comprising:

determining an orientation of the point cloud data associated with each position of the plurality of positions; and merging the point cloud data associated with each position of the plurality of positions with point cloud data associated with adjacent positions based on the orientation of the point cloud data associated with each position.

20. The system of claim 12, wherein the first axis of rotation of the rotator is parallel to the path that the distal end of the telescopic pole is extended along.

\* \* \* \* \*